United States Patent [19]
Harper

[11] 3,718,001
[45] Feb. 27, 1973

[54] WAVE RIDING WATER BARRIER
[76] Inventor: John D. Harper, P.O. Box 83, Route 1, Elgin, Ill. 60120
[22] Filed: Feb. 17, 1971
[21] Appl. No.: 116,166

[52] U.S. Cl. ................................................. 61/1 F
[51] Int. Cl. ........................................... E02b 15/04
[58] Field of Search ........... 61/1 F; 210/242, DIG. 21

[56] References Cited

UNITED STATES PATENTS

| 3,613,376 | 10/1971 | Midby | 61/1 F |
| 3,537,587 | 11/1970 | Kain | 61/1 F X |
| 3,146,598 | 9/1964 | Smith | 61/1 F |

FOREIGN PATENTS OR APPLICATIONS

| 317,928 | 11/1969 | Sweden | 61/1 F |

*Primary Examiner*—Jacob Shapiro
*Attorney*—Wolfe, Hubbard, Leydig, Voit & Osann

[57] ABSTRACT

A floating barrier formed of flexible material having flexible buoyancy pockets on either side of the barrier fitted with float elements slightly smaller than the pockets so that the elements can move relatively in a vertical direction in response to wave action without moving or bending the barrier itself. The float elements are protected in sealed plastic bags.

2 Claims, 4 Drawing Figures

PATENTED FEB 27 1973
3,718,001
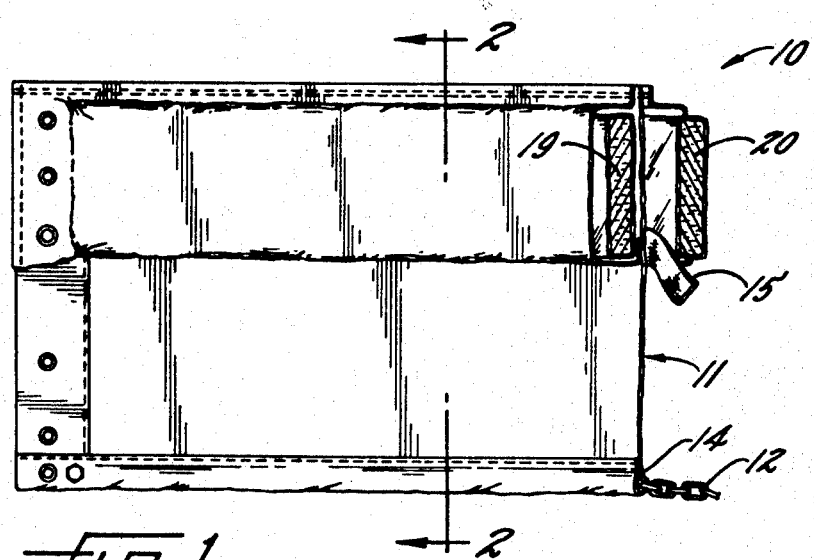
fig.1.
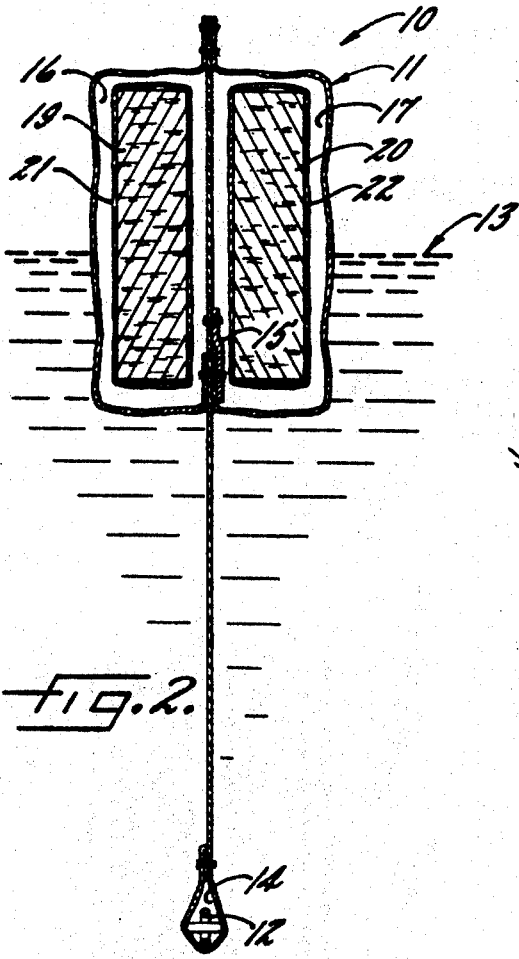
fig.2.
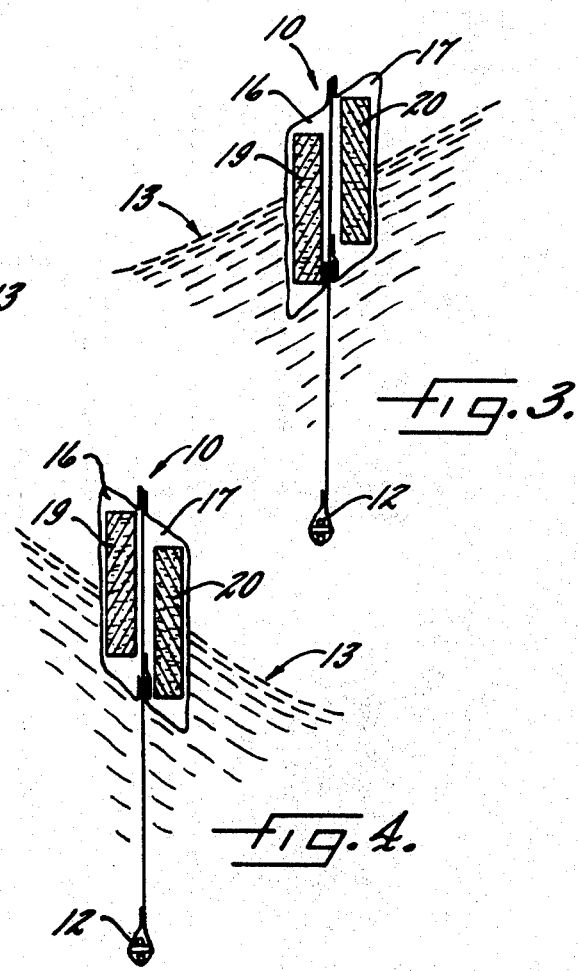
fig.3.
fig.4.
INVENTOR.
JOHN D. HARPER,
BY
Wolfe, Hubbard, Leydig, Voit & Osann
ATTORNEYS.

WAVE RIDING WATER BARRIER

DESCRIPTION OF THE INVENTION

This invention relates to floating water barriers and more particularly to a flexible temporary barrier for control of localized surface pollution.

To prevent the spread of floating water pollutants, it has long been common to surround the polluted area with a floating barrier defining a vertical curtain extending through the water surface so as to block the polluting material. In still water, almost any kind of curtain barrier is reasonably effective but, when wave action is encountered, barrier effectiveness often decreases considerably. Obviously, a barrier must be sufficiently flexible in the horizontal plane to surround or be otherwise deployed relative to the area being contained. Also, it will be apparent that a barrier must have some vertical flexibility so as to bend up and down with wave motion so that portions of the barrier are not lifted clear of the water surface nor are the high portions of waves spilled over the barrier.

In addition to the above kinds of flexibility, it has been found that pollutants often escape beneath the floating barrier curtain when the barrier is not flexible with respect to the transverse water surface. That is, a wave moving parallel to the length of such a barrier curtain causes the curtain to incline relative to the true vertical making it easier for polluting material to move beneath or spill over the barrier.

Another problem encountered by present day barriers is the sometimes pernicious nature of the polluting substances. Some petroleum derived substances have been found to soak into and degrade foamed plastics of the kind often employed for barrier floats.

Accordingly, it is the primary aim of the invention to provide a floating water barrier that is flexible not only in both vertical and horizontal planes, but also is flexible in the sense of being able to ride wave slopes without tilting sharply from a substantially vertical disposition.

Another object of the invention is to provide a barrier of the above type with float elements that are protected from the effects of pernicious pollutants.

It is also an object to provide a barrier as characterized above which is economical to manufacture and which has major components suited for salvage and reuse after inevitable barrier damage so as to further reduce the cost of employing the barrier.

Other objects and advantages of the invention will become apparent upon reading the following detailed description and upon reference to the drawings, in which:

FIG. 1 is a fragmentary side elevation showing a water barrier embodying the invention;

FIG. 2 is a cross section of the barrier taken along the line 2—2 in FIG. 1; and FIGS. 3 and 4 are similar to FIG. 2 and illustrate the disposition of the parts under alternate wave conditions.

While the invention will be described in connection with a preferred embodiment, it will be understood that I do not intend to limit the invention to that embodiment. On the contrary, I intend to cover all alternatives, modifications and equivalents as may be included within the spirit and scope of the invention.

Turning to the drawings, there is shown a barrier 10 embodying the invention which includes a strip 11 of flexible material, such as vinyl coated nylon formed to define a curtain. A ballast mass 12 is disposed at one edge of the strip 11 to retain one edge of the strip below the water surface 13. In the illustrated embodiment, the ballast mass 12 takes the form of a galvanized chain contained in a pocket 14 formed upon the lower edge of the strip. To prevent separation of the barrier, a tension carrying reinforced webbing 15 is provided.

In accordance with the invention, the barrier 10 is provided with wave-riding flexibility so as to allow it to ride wave slopes without tilting sharply from a substantially vertical position, as shown particularly in FIGS. 3 and 4. This flexibility is obtained in the illustrated embodiment by providing a pair of flexible buoyancy pockets 16 and 17 formed in opposite sides of the strip 11 at the opposite or top edge. To avoid moving or bending the strip 11 itself in response to wave action, the floats 19 and 20 are sized so as to have a limited freedom of movement parallel to the strip 11.

In accordance with another aspect of the invention, petroleum and other pernicious substances are prevented from soaking into and degrading the floats 19 and 20. In the illustrated embodiment, the floats are formed of closed cell foamed plastic and a sealed plastic film bag 21 and 22 closely enclosing each of the floats 19 and 20, respectively is provided.

I claim as my invention:

1. A floatable oil barrier comprising, in combination, a strip of flexible material defining a curtain, a ballast mass disposed at one edge of said strip, a pair of flexible buoyancy pockets formed in opposite sides of said strip at the edge opposite said ballast mass with the tops and bottoms of said pockets being secured to said strip, and a pair of floats disposed loosely one in each of said pockets, said pockets and said floats being sized so that said pockets can freely flex and said floats have limited freedom of movement parallel to said strip without moving or bending the strip itself.

2. The combination of claim 1 in which said floats are formed of closed cell foamed plastic and are rectangular in cross section with the long side of the rectangle lying adjacent said strip.

* * * * *